(12) United States Patent
Barsness et al.

(10) Patent No.: US 10,409,812 B2
(45) Date of Patent: Sep. 10, 2019

(54) QUERY RESTART BASED ON CHANGING SYSTEM RESOURCES AND AN AMOUNT OF DATA CHANGE

(71) Applicant: International Business Machines Corporation, Armonk, NY (US)

(72) Inventors: Eric L. Barsness, Pine Island, MN (US); Daniel E. Beuch, Rochester, MN (US); Alexander Cook, Rochester, MN (US); Brian R. Muras, Otsego, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/384,595

(22) Filed: Dec. 20, 2016

(65) Prior Publication Data
US 2018/0173759 A1 Jun. 21, 2018

(51) Int. Cl.
*G06F 16/00* (2019.01)
*G06F 16/2453* (2019.01)

(52) U.S. Cl.
CPC .............. *G06F 16/24542* (2019.01)

(58) Field of Classification Search
CPC ................ G06F 17/30463; G06F 16/24542
USPC ........................................................ 707/716
See application file for complete search history.

(56) References Cited

U.S. PATENT DOCUMENTS

| | | | |
|---|---|---|---|
| 6,546,403 B1 | 4/2003 | Carlson, Jr. et al. | |
| 8,601,474 B2 * | 12/2013 | Konik | G06F 9/455 718/1 |
| 9,213,741 B2 | 12/2015 | Burger et al. | |
| 2006/0136396 A1 * | 6/2006 | Brobst | G06F 16/284 707/999.003 |
| 2007/0282794 A1 * | 12/2007 | Barsness | G06F 16/24549 707/999.002 |
| 2008/0133458 A1 * | 6/2008 | Zabback | G06F 16/24545 707/999.002 |

OTHER PUBLICATIONS

U.S. Appl. No. 15/384,572, entitled "Query Restart Based on Changing System Resources and an Amount of Data Change", filed Dec. 20, 2016.
IBM "List of IBM Patents or Patent Applications Treated as Related".

* cited by examiner

*Primary Examiner* — Chelcie L Daye
(74) *Attorney, Agent, or Firm* — Patterson + Sheridan, LLP (57) ABSTRACT

Techniques are described for re-starting queries based on an expected amount of data to be changed in a database. Embodiments of the present disclosure may generally receive a first query to be executed against a database, and start execution of the first query against the database according to a first access plan. Upon detecting, during execution of the first query, that an amount of data to be changed in one or more tables of the database as a result of a second query satisfies a predetermined condition, embodiments of the present disclosure determine whether to re-start execution of the first query against the database with a second access plan different from the first access plan or wait a predetermined period of time before re-starting execution of the first query against the database with the first access plan.

19 Claims, 6 Drawing Sheets

QUERY RESTART BASED ON CHANGING SYSTEM RESOURCES AND AN AMOUNT OF DATA CHANGE

BACKGROUND

The present disclosure generally relates to database management systems, and in particular, to techniques for optimizing query execution based in part on changing system resources and/or an amount of data to be changed in executing the query.

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems. From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database.

SUMMARY

One embodiment presented herein describes a method for re-starting a query. The method generally includes receiving a first query to be executed against a database, and starting execution of the first query against the database according to a first access plan. The method also includes upon detecting, during execution of the first query, that an amount of data to be changed in one or more tables of the database as a result of a second query satisfies a predetermined condition, determining whether to re-start execution of the first query against the database with a second access plan different from the first access plan or wait a predetermined period of time before re-starting execution of the first query against the database with the first access plan.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

DETAILED DESCRIPTION

In many cases, while the database system is processing a given query (e.g., executing the query against a database), the system environment can undergo or experience changes that make the system environment substantially different from when the system started processing the query. Such changes, for example, can include changes in the amount of memory available in the system, changes in the processing capability in the system, changes in the amount of storage (e.g., disks), and the like. The changes to the system environment can be due to physical resources being added or removed from the database system (e.g., an administrator could manually change the amount of resources in the database system), a re-allocation of system resources shared between clients in the database system (e.g., a hypervisor adjusting allocation of CPU and/or memory for clients), dynamic memory pool allocation changes, jobs starting or ending, etc. In cases where the amount of system resources changes significantly during processing of a query, allowing the database system to adapt the query processing in real-time in order to leverage the changing system environment can improve the system performance in processing of queries.

As such, embodiments herein provide techniques for re-starting queries based on a change in the amount of system resources (e.g., CPUs, memory, storage, etc.). As described below, the database system may include a query management component that is configured to monitor the amount of available system resources in the database system and adapt processing of a query based on detecting, during the processing of the query, that the amount of resources satisfies a predetermined condition.

For example, upon receiving a query to be executed against a database, the query management component can determine, based on an amount of available system resources, a first access plan (or query plan) to use for executing the query against the database. Once determined, the query management component can begin executing the query against the database according to the first access plan.

While executing the query according to the first access plan, the query management component may detect that an amount of change in the available system resources that satisfies a predetermined condition. In one embodiment, for example, the query management component may determine that an amount of available resources in the system exceeds a threshold. In one embodiment, the query management component may determine that the amount of available resources in the system is below a threshold. If the query management component detects that a threshold is met, the query management component can create a second access plan in the background while executing the query according to the first access plan. The query management component can compare the second access plan with the first access plan that is executing (e.g., comparing the estimated run time, resources required, etc., of each plan). If the query management component determines that execution of the query would be improved with the second access plan (e.g., faster execution time, decreased amount of system resources, etc.), the query management component can halt the execution of the first access plan and start executing the query with the second access plan. In this manner, the query management component allows the database system to stop the current execution of the query and re-start the query with a new access plan that is more suited to the current system environment.

Additionally, embodiments provide techniques for optimizing queries based on an amount of data to be changed (e.g., in one or more tables of the database) when processing queries. In some instances, while the database system is executing queries against the database, the underlying tables of the database can undergo changes in terms of the amount of data being added, removed, and/or modified in the tables of the database. For example, executing a query against a database typically involves performing a set of input and output operations on the database table(s). Thus, while performing the set of operations, the underlying database tables could be changing, for example, as a result of other jobs inserting, updating, or deleting rows of the database tables. Depending on the amount and/or rate of the underlying changes to the tables, there can be instances in which continuing to execute a query against the rapidly changing database table can produce unexpected results.

For example, assume that the database system is executing a SQL join (e.g., to join Table A and Table B) and estimated that, for this particular join operation, there would be 50 million rows in Table B that matched rows in Table A. Further assume that, during the execution of the SQL join, the underlying tables in the database (e.g., Table A and Table B) are being updated at a rate such that, if the join operation was fully executed, the number of rows affected would be 500 million rows instead of 50 million rows. In these cases, it may be beneficial to allow the database system to adapt to the underlying changing database tables in real-time by ending the current execution of the query, and re-starting the query with a new access plan more suited to the current database tables. However, the database system can also be configured to prevent infinite loops. That is, if the data keeps changing, the database system can be configured to prevent the access plans from changing indefinitely.

As such, the query management component (in the database system) can be configured to detect, during the execution of a query, whether the results from executing that query would be substantially different (e.g., if the query were to be canceled and restarted) from what was originally estimated. For example, upon receiving a query to be executed against a database, the query management component can start executing the query against the database according to a first ordered sequence of operations (associated with a first access plan) to be performed on the database table(s). While executing the query, the query management component may determine that the amount of data to be changed in the database table(s) as a result of the first access plan satisfies a predetermined condition. For example, the query management component may determine that the amount of data to be changed from what was originally estimated satisfies a threshold amount of data change. If the threshold is met, the query management component can halt the execution of the query, determine a second access plan for executing the query based on the amount of data to be changed (e.g., the delta amount of data from what was originally estimated), and re-start executing the query with the second access plan. In some cases, the query management component can determine the second access plan in the background (e.g., while executing the query with the first access plan), and begin executing the query according to the second access plan if it determines (e.g., while executing the query with the first access plan) the second access plan would improve execution of the query. In this manner, the query management component allows the database system to adapt the processing of the query in situations where the results from the execution of the query would be substantially different, e.g., due to underlying changes in the database table(s). The query management component can also be configured to prevent infinite loops from happening in the database system (e.g., in cases where the data in the underlying database tables is constantly changing).

Figure 1:
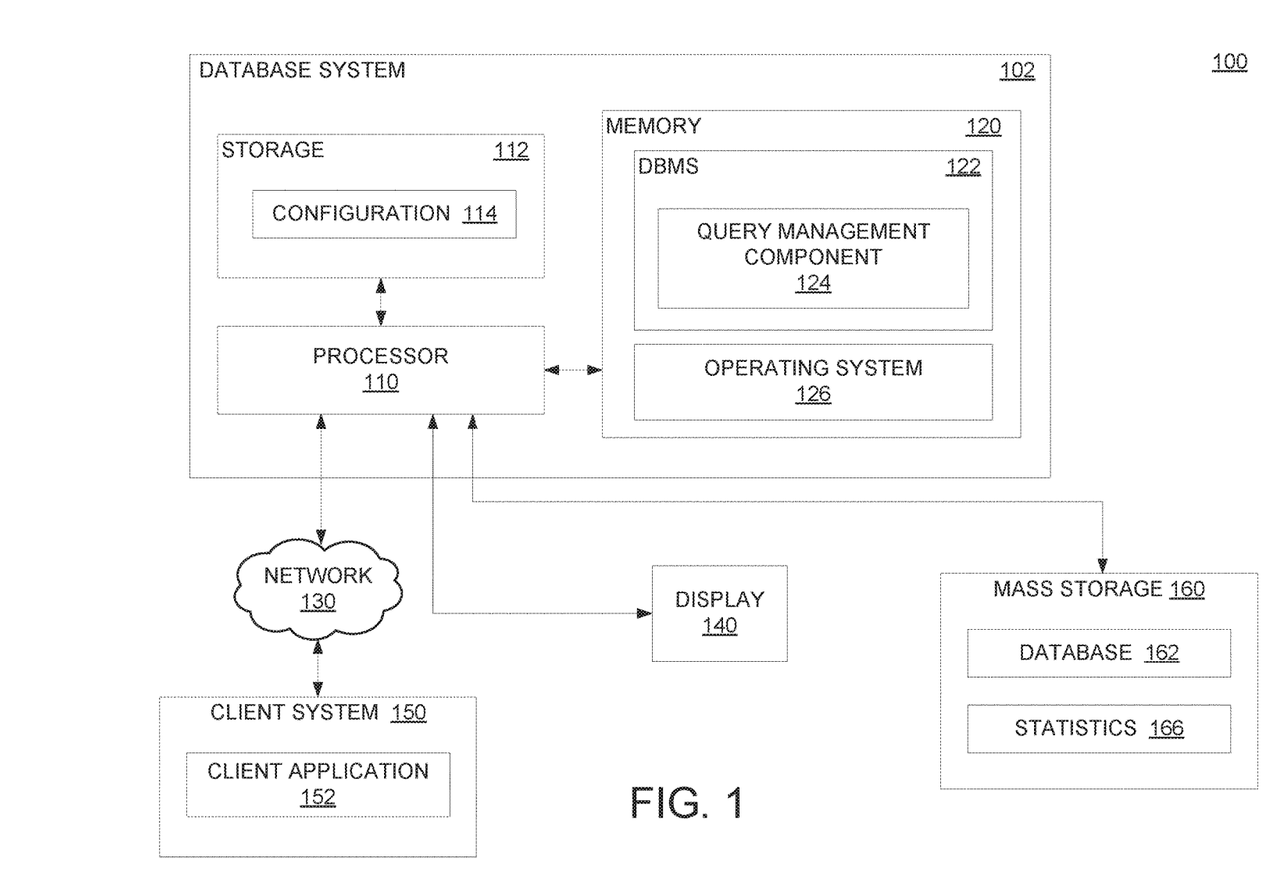
FIG. 1 is a block diagram illustrating a database system configured with a query management component, according to one embodiment of the present disclosure.

FIG. 1 is a block diagram illustrating a database system configured with a query management component, according to one embodiment described herein. Generally, system 100 represents practically any type of computer, computer system or other programmable electronic device, including a client computer, a server computer, a portable computer, a handheld computer, an embedded controller, etc. Moreover, the system 100 may be implemented using one or more networked computers, e.g., in a cluster or other distributed computing system.

As shown, system 100 includes database system 102 and a client system 150, interconnected via network 130. Generally, the client system 150 may submit requests (i.e., queries) over the network 130 to a DBMS running on the database system 102. For example, the client system 150 includes a client application 152, which is generally capable of generating queries. Once generated, the query may be submitted over the network 130 to a DBMS (e.g., DBMS 122) for execution.

The term "query" specifies a set of commands for retrieving data from a database. Queries may take the form of a command language, such as the Structured Query Language (SQL), and enable users (e.g., administrators, programmers, developers, etc.) and programs to access data within the database. For instance, queries can be used to select, insert, delete, update, find out the location of data, join tables, and so forth. Generally speaking, any requesting entity can issue queries against data in a database. For example, software applications (such as by an application running on the client system 150), and operating systems may submit queries to the database. These queries may be predefined (i.e., hard coded as part of an application) or may be generated in response to input (e.g., user input during an interactive session associated with an application as is the case with ad hoc queries). Upon receiving the request, the DBMS 122 on the database system 102 may execute the request against a database specified in the request, and then return the result of the executed request.

Additionally, database system 102 is communicatively coupled to a display device 140 and a mass storage device 160. The database system 102, as shown, includes at least one processor 110 coupled to a memory 120. Processor 110 may represent one or more processors (e.g., microprocessors), and memory 120 may represent the random access memory (RAM) devices comprising the main storage of the database system 102, as well as any supplemental levels of memory, e.g., cache memories, non-volatile or backup memories (e.g., programmable or flash memories), read-only memories, etc. In addition, memory 120 may be considered to include memory storage physically located elsewhere in system 100, e.g., any cache memory in processor 110, storage 112, as well as any storage capacity used as a virtual memory, e.g., as stored on a mass storage device 160 or on another computer coupled to system 100 via network 130 (e.g., a client computer 150).

Generally, the database system 102 typically receives a number of inputs and outputs for communicating information externally. For interface with a user or operator, the database system 102 typically includes one or more user input devices (e.g., a keyboard, a mouse, a trackball, a joystick, a touchpad, and/or a microphone, among others) and provides a graphical user interface via display device 140 (e.g., a CRT monitor, an LCD display panel, among others). Otherwise, user input may be received via another computer interfaced with the database system 102 (e.g., over network 130), or via a dedicated workstation interface or the like.

For additional storage, the database system 102 is configured to interface with mass storage 160, e.g., a hard disk drive, a direct access storage device (DASD), an optical drive (e.g., a CD drive, a DVD drive, etc.), and/or a tape drive, among others. The network 130 generally represents any data communications network (e.g., a LAN, a WAN, a wireless network, and/or the Internet, among others) and generally permits electronic communication of information between the database system 102 and other computers coupled to the network 130 (e.g., client system 150). It should be appreciated that database system 102 may also include suitable analog and/or digital interfaces (not shown) between processor 110 and each component (e.g., network 130, display 140, etc.).

Memory 120 includes a DBMS 122 and an operating system 126. Generally, the database system 102 operates under the control of the operating system 126, and executes or otherwise relies upon various computer software applications, components, programs, objects, modules, data structures, etc. The DBMS 122 is configured with a query management component 124, which is configured to perform one or more of the techniques described herein. Generally, the DBMS 122 facilitates the creation and management of the database 162. For example, the DBMS 122 could provide an Application Program Interface (API) through which remote clients (e.g., the client application 152 on the client system 150) can submit requests (e.g., database queries). For example, the client application 152 can submit a database query to retrieve particular values from the database 162. The DBMS 122 could execute the database query against the database 162 to produce a set of query results and return the query results to the client application 152 (e.g., over network 130).

As noted, while the DBMS 122 is executing queries against the database 162, the underlying database system 102 could be changing in terms of the amount of resources (e.g., processors, memory, disk, etc.) available at any given time on the database system 102. For example, the DBMS 122 could generate an access plan based on X amount of memory available in the database system 102, and begin processing of a query (e.g., executing the query against database 162) based on the access plan. While the DBMS 122 is processing the query, however, the amount of memory available in database system 102 could be adjusted. For example, a hypervisor could allocate additional memory to the logical partition (e.g., in situations where memory is shared), one or more jobs could end during the processing of the query freeing up memory, there could be memory pool allocation changes, etc. In situations where the amount of change of resources is significant (e.g., satisfies a predetermined condition), the DBMS 122 could improve the performance of the query execution by halting and re-planning based on the changed resource availability in the database system 102.

Further, in some cases, while the DBMS 122 is executing queries against the database 162, the underlying tables of the database 162 could be changing. This could occur, for example, through updates, deletions, inserts, etc. to the database 162 while the DBMS 122 is executing a given query against the database 162. Such changes can have a significant impact on the results of a query execution. For example, if the DBMS 122 is performing a delete operation to delete rows of table(s) in the database 162 that satisfy condition=X, and additional rows satisfying condition=X are added to the tables(s), or existing rows satisfying condition=X are deleted from the table(s), the delete operation could delete more or less of the rows from the tables of the database 162 than expected. In situations where the amount of data changed in the database tables is significant (e.g., satisfies a predetermined condition), the DBMS 122 could improve the performance of the query execution by halting and re-planning based on the current state of the database tables.

Note that, in some embodiments, rather than halt the first access plan and determine a second access plan for executing the query, the DBMS 122 can be configured to determine a second access plan in the background (e.g., while executing the query according to the first access plan), and, once determined, begin executing the query according to the second access plan.

Generally, the query management component 124 is configured to manage the execution of a query in a manner that accounts for underlying system changes in the database system 102 and/or changes in the tables of database 162. For example, while processing a given query, the query management component 124 can monitor the amount of resources available in database system 102 to determine if the amount of resources has changed from when the DBMS 122 started processing the query. In one embodiment, the query management component 124 can poll for system resources changes (e.g., in resource configuration 114) on database system 102. In one embodiment, the query management component can receive an indication of a resource configuration change (e.g., from operating system 126, processor 110, etc.). In addition, while processing a query, the query management component 124 can be configured to monitor the tables of database 162 to detect changes in an amount of data to be changed as a result of processing the query. In one embodiment, the query management component 124 can keep track of the state of the tables in database 162 based on statistics 166. For example, the statistics file 166 can reflect whether there have been insertions, deletions, updates, etc., to one or more tables of the database 162.

If, during the processing of a query, the query management component 124 detects that the amount of available system resources has changed and/or that the table(s) in database 162 has changed, the query management component 124 can decide whether to halt the execution of the query and re-plan to leverage the current environment, based on whether the changed amount of resources and/or amount of change in the tables satisfies one or more predetermined conditions. As described in more detail below, if the query management component 124 determines that the changing environment satisfies the predetermined condition, the query management component 124 can halt the execution of the query, determine a new access plan more suited to the current environment, and re-start processing the query according to the new access plan.

Figure 2:
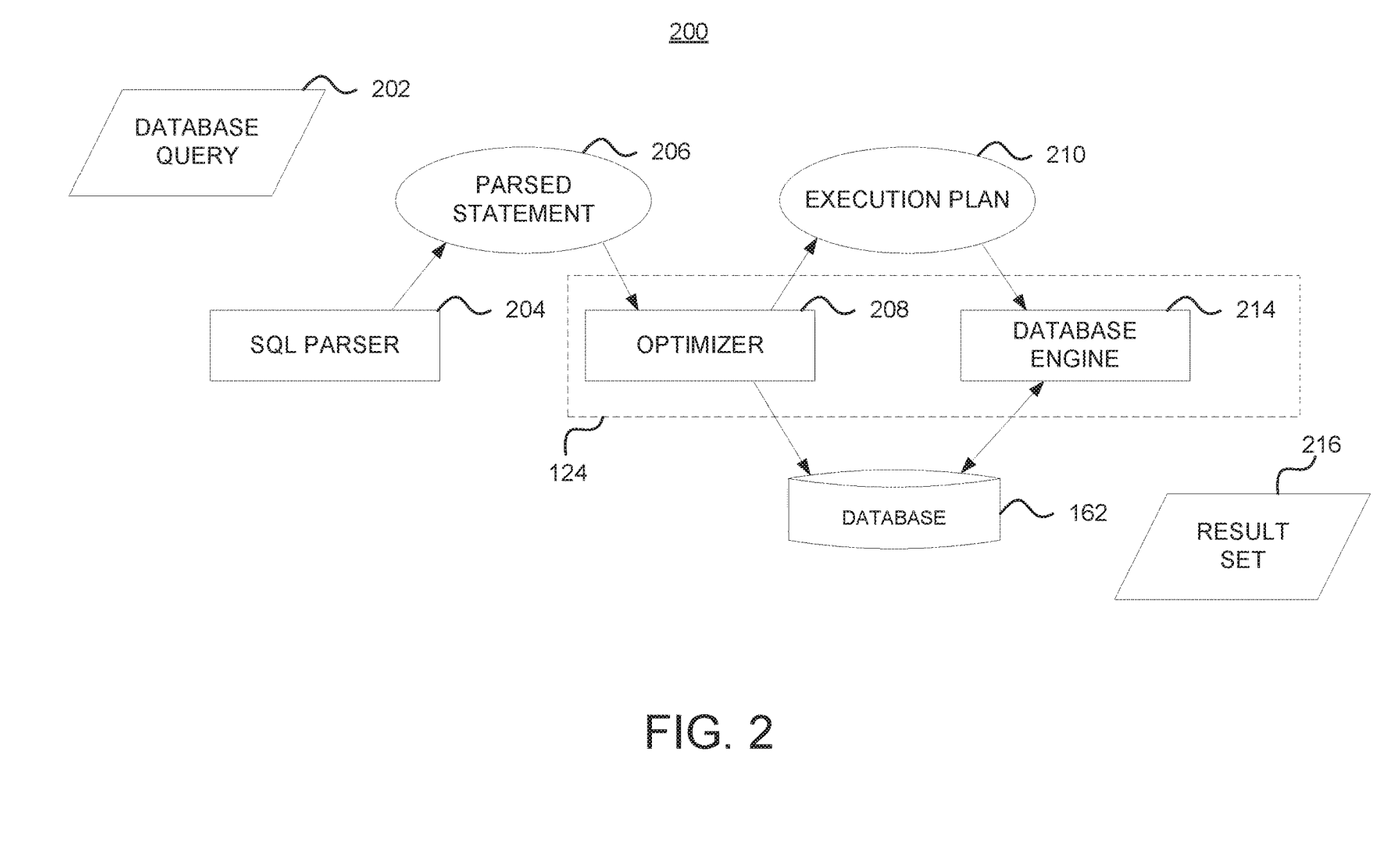
FIG. 2 is a flow diagram for processing a database query, according to one embodiment of the present disclosure.

FIG. 2 is a flow diagram 200 for processing a query at a database management system (e.g., DBMS 122), according to one embodiment. In the diagram 200, the query management component 124 can include the optimizer component 208 and database engine 214. As shown, the DBMS 122 receives a database query 202 from a requesting entity (not shown). The received query is processed by a SQL parser 204 to generate a parsed statement 206. The parsed statement 206 is passed to an optimizer component 208 for query optimization. The optimizer component 208 can determine an ordered sequence of operations (e.g., execution plan 210, also referred to herein as an access plan, or a query plan) for the database engine 214 to use when executing the database query 202 against the database 162.

The optimizer component 208 can consider different types of information (e.g., such as platform capabilities, system resources, expected amount of data change, query content information, etc.) when generating the execution plan 210. Such information can be stored in database 162, or other locations (e.g., resource configuration 114, database statistics 166, database system 102, etc.). In one embodiment, the optimizer component 208 can generate the execution plan 210 based on an amount of available system resources in the system (e.g., database system 102). For example, assume that the system has limited CPU resources (e.g., one CPU is available, CPU resources are constrained, etc.). Further assume that the system has the ability to use parallelism (e.g., symmetric multiprocessing (SMP)) to execute the query. In this reference example, when the query starts to run, the optimizer component 208 may detect the limited CPU resources and generate a plan that does not aggressively use SMP.

In one embodiment, the optimizer component 208 can generate the execution plan 210 based on an expected amount of data to be changed in tables of the database 212. For example, the optimizer component 208 could use a table scan to implement a SQL SELECT statement that touches a large amount of rows in a particular table. Once generated, the execution plan 210 is forwarded to database engine 214 for execution on the information in database 162. The result of the execution of the database query is typically stored in a result set 216, which can then be returned to the requesting entity. Note FIG. 2 provides a reference example of components that may be incorporated into the DBMS. Those of ordinary skill in the art will recognize that other components may be incorporated into the DBMS, as may other suitable database management architectures. Other database programming and organizational architectures may also be used consistent with the disclosure. Therefore, the present disclosure is not limited to the particular implementation discussed herein.

In the diagram 200, the query management component 124 could halt the execution of a query if the query management component 124 determines, while executing the query, that the amount of change in the available system resources satisfies a predetermined condition and/or that the amount of data to be changed in the tables of the database 162 satisfies a predetermined condition. The query management component 124 can use query optimizer 208 to generate (e.g., in the background or after halting the first access plan) a different access plan based on at least one of the amount of change in the system resources and the amount of data to be changed in the database tables.

For example, if the query management component 124 determines that there is an increase in the available system resources that exceeds a threshold amount of system resources, the query management component 124 can halt the current execution of the query, and generate another access plan that takes into account the increased amount of system resources. Continuing with the above example, the query management component 124 may begin executing a query with an access plan that does not aggressively use SMP (e.g., may use a single or a limited number of threads). If, however, during the execution of the query, the query management component 124 detects that additional CPU resources are available, the query management component 124 can generate another access plan that uses more threads, and therefore more CPU resulting in a faster execution of the query. In another example, if the database engine 214 is currently using an indexing method to execute the query, the query optimizer component 208 could halt the query execution, generate another access plan that can leverage the increased amount of resources (e.g., creating one or more temporary hash tables), and re-start execution of the query with the new access plan.

Similarly, if the query management component 124 determines that the amount of data to be changed in the database tables exceeds a threshold amount of data, the query management component 124 generate (e.g., in the background while executing the first access plan, or after halting the first access plan) another access plan that takes into account the increased amount of data change. Continuing with the above example of an SQL SELECT statement, assume that the SQL SELECT statement has to touch a large number of rows in a particular table. While it is running, assume that another job issues a DELETE statement that significantly reduces the number of rows in the table. In this reference example, the query management component 124 may detect the "DELETE" activity occurring in the database table and decide to either re-plan or even wait for a predetermined period of time for the DELETE statement to process. Doing so can significantly reduce the amount of data the SELECT statement has to process in the database table, which in turn can improve the execution of the query. In this manner, the query management component 124 enables the database engine 214 to leverage the changing system environment to improve the execution of queries.

Figure 3:
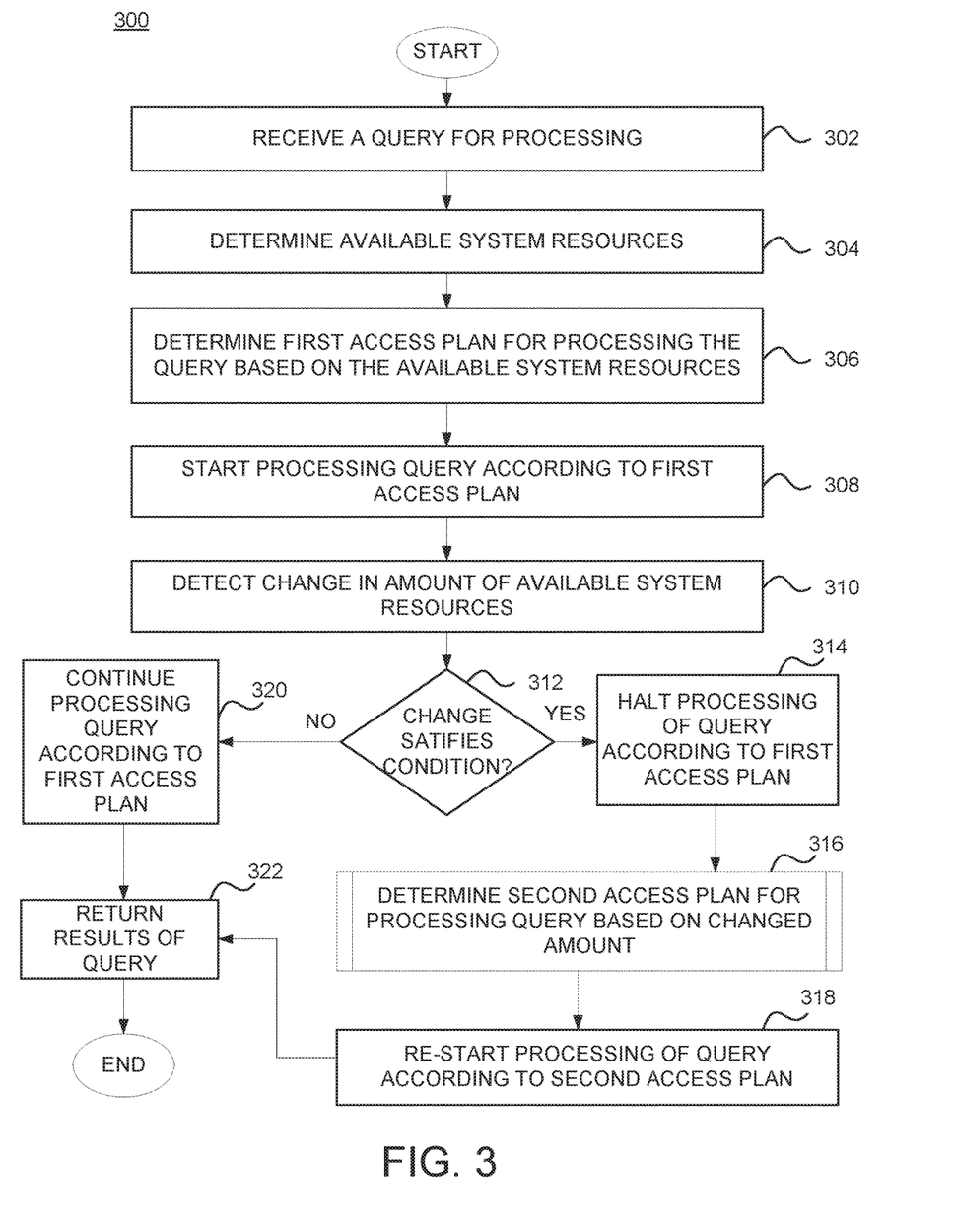
FIG. 3 is a flow chart illustrating a method for restarting a query based on an amount of available system resources, according to one embodiment of the present disclosure.

FIG. 3 is a flow diagram illustrating a method 300 for restarting a query based on an amount of available system resources, according to one embodiment. As shown, the method 300 begins at block 302 where a DBMS (e.g., DBMS 302) receives a query for processing (e.g., execution against database 162). At block 304, the query management component 124 determines an amount of system resources available in the system (e.g., database system 102). For example, the query management component 124 can determine the current state of system resources based on resource configuration 114. At block 306, the query management component 124 determines a first access plan for processing the query based on the available system resources. That is, the query management component 124, in general, can decide whether to use a more resource intensive access plan, less resource intensive plan, etc., based on the available system resources.

At block 308, the query management component 124 starts processing the query according to the first access plan. During the execution of the query, the query management component 124 detects a change in the amount of available system resources (block 310). That is, the query management component 124 can detect a change in at least one of an amount of processors, an amount of memory, an amount of storage (e.g., disk), etc., in the database system. The detected change in the amount of resources can be determined with respect to the amount of resources determined for the system when the first access plan was generated (e.g., blocks 304-306).

To detect the change in the amount of resources, the query management component 124, in one embodiment, can poll the system environment for changes in the amount of resources. For example, as the amount of resources in the system changes (e.g., due to jobs freeing up, resource adjustments by a hypervisor, actions by an operator (or administrator), etc.), the DBMS 122 (or other components of the database system) can keep track of the changes in resource configuration 114. Thus, while executing a query, the query management component 124 can periodically check the configuration 144 to determine if there have been significant changes in the amount of resources available in the database system. In one embodiment, the query management component 124 can receive an indication of a resource configuration change in the database system. That is, the database system can be configured to notify the query management component 124 as to any changes in the amount of system resources.

At block 312, the query management component 124 determines if the change in the amount of resources satisfies a predetermined condition. In one embodiment, the predetermined condition can include determining that an increase in the amount of available resources exceeds a threshold amount of system resources. In one embodiment, the predetermined condition can include determining that a decrease in the amount of available resources is below a threshold amount of system resources. If the query management component 124 determines the amount of change in system resources does not satisfy the predetermined condition, the query management component 124 continues processing the query according to the first access plan (block 320). The query management component 124 then returns the results of the query to the requesting entity (block 322), and the method ends.

On the other hand, if at block 312, the query management component 124 determines the amount of change in resources satisfies the predetermined condition, the query management component 124 halts processing of the query according to the first access plan (block 314). Once halted, the query management component 124 determines a second access plan for processing the query based on the changed amount of system resources (block 316). At block 318, the query management component 124 re-starts processing of the query according to the second access plan, and once completed, returns results of the query to the requesting entity (block 322). Note that, in one embodiment, the query management component 124 can determine the second access plan in the background while executing the query according to the first access plan. In such a case, the query management component 124 can compare estimated resources, run time, etc. of the second access plan with those of the first access plan that is still executing. If the query management component 124 determines the second access plan is "better" than the currently executing first access plan (e.g., the second access plan may have an improved execution time, etc.), the query management component 124 can halt the first access plan and use the second access plan to execute the query. The method 300 then ends.

Figure 4:
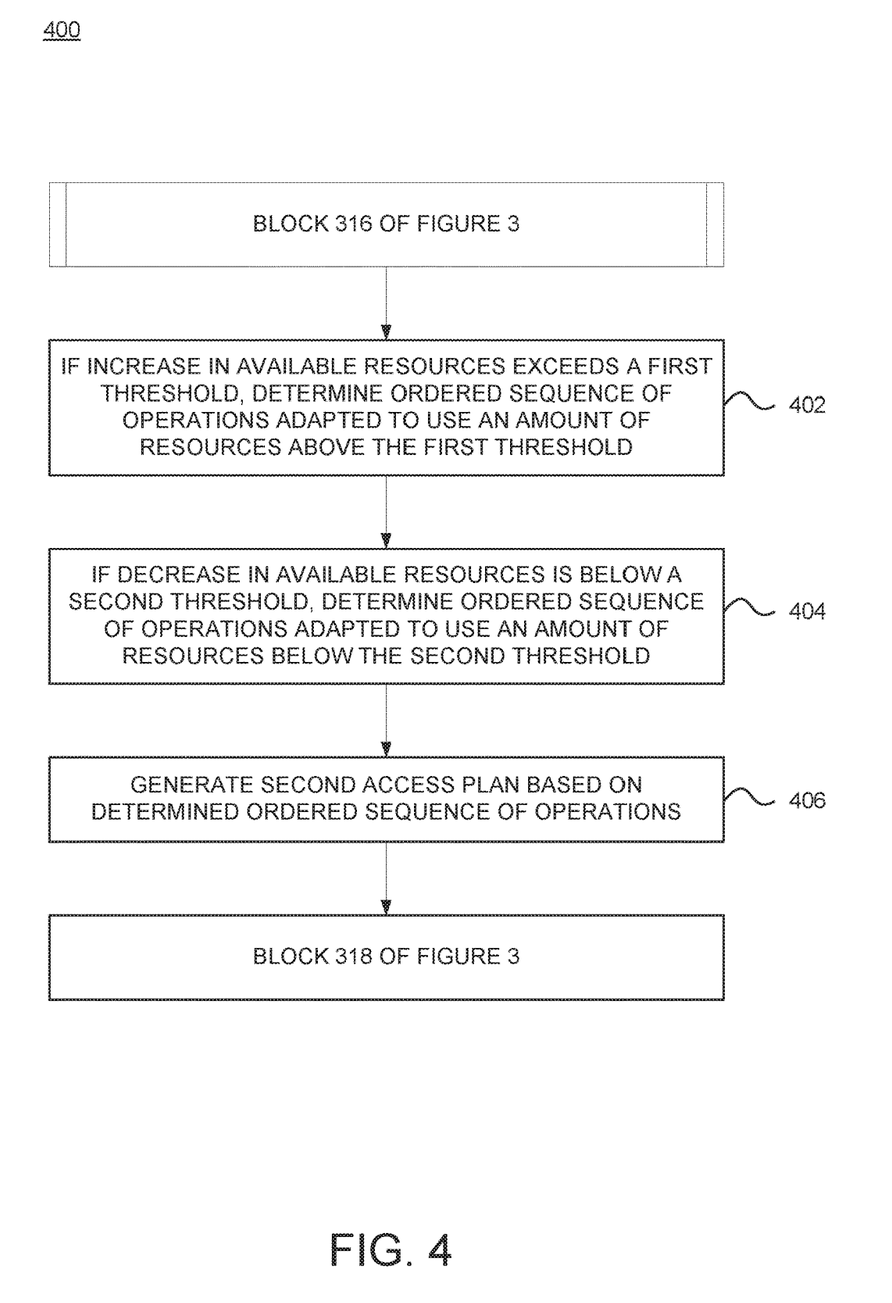
FIG. 4 is a flow chart illustrating a method for determining a query plan based on an amount of available system resources, according to one embodiment of the present disclosure.

FIG. 4 is a flow chart illustrating a method 400 for determining a query plan based on an amount of available system resources, according to one embodiment. Method 400 begins at block 316 of FIG. 3, where the query management component 124 determines a second access plan for processing the query based on the changed amount of system resources. If the query management component 124 detects an increase in available system resources that exceeds a first threshold, the query management component 124 determines an ordered sequence of operations adapted to use an amount of resources above the first threshold (block 402). Alternatively, if the query management component 124 detects a decrease in available system resources that is below a second threshold, the query management component 124 determines an ordered sequence of operations adapted to use an amount of resources below the second the second threshold (block 404). At block 406, the query management component 124 generates a second access plan based on the determined ordered sequence of operations. The method 400 then proceeds to block 318 of FIG. 3.

As mentioned above, the query management component 124 can also be configured to re-start queries based on an amount of data to be changed in the database tables.

Figure 5:
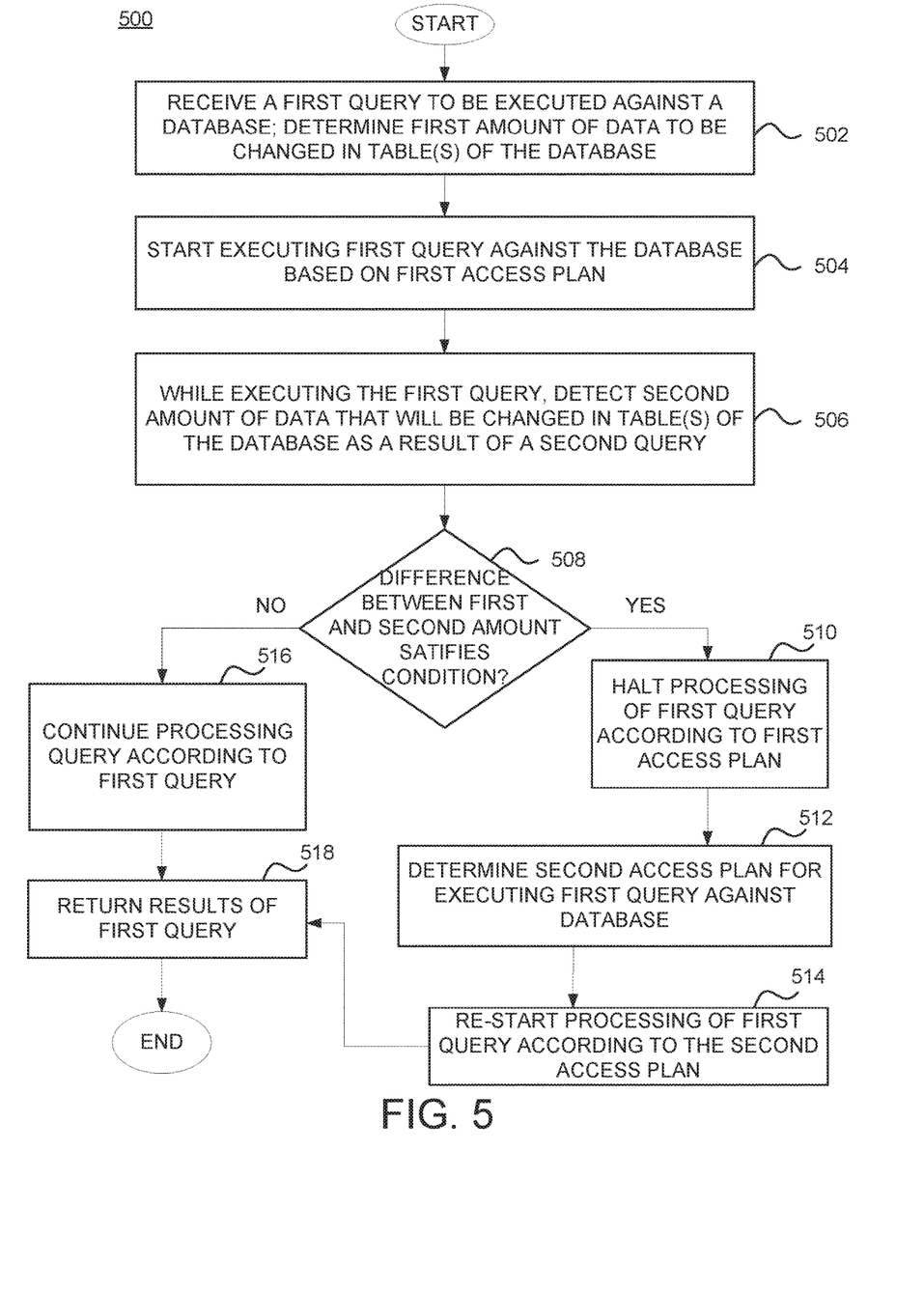
FIG. 5 is a flow chart illustrating a method for restarting a query based on an amount of data to be changed in processing the query, according to one embodiment of the present disclosure.

FIG. 5 is a flow chart illustrating a method 500 for restarting a query based on an amount of data to be changed in processing the query, according to one embodiment. As shown, the method 500 begins at 502 where the query management component 124 receives a first query to be executed against a database (e.g., database 162). Once received, the query management component 124 can determine (or estimate), based on the first query, a first amount of data to be changed in the one or more tables of the database. At block 504, the query management component 124 starts executing the first query against the database based on a first ordered sequence of operations associated with a first access plan.

At block 506, while executing the first query, the query management component 124 detects a second amount of data that will be changed in one or more tables of the database as a result of a second query. For example, in one embodiment, the query management component 124 can monitor, during the execution of the query, a rate of change of data in the one or more tables of the database (e.g., based on the database tables statistics) in response to one or more operations of the second query. As noted, the data that is changed in the database tables can be in response to one or more of an insertion of one or more rows in one or more tables of the database, an update to one or more rows in one or more tables of the database, a deletion of one or more rows in the one or more tables of the database, etc. Such operations can be from one or more other jobs operating on the database while the query management component 124 is executing queries against the database with the first access plan.

Assume, for example, that the query management component 124 receives as a first query a "SELECT * from TABLEA a, TABLEB b where a.key=b.key and a.color='BLUE' and b.size='large'". If such a query is running and there are slightly fewer rows with color of blue than size of large, the query management component 124 may put TABLEA in the first join position. Further, assume that while the SELECT is running, another job issues "DELETE from TABLEB where size='large' and shipdate<'1/1/2000'" to purge out old stock. In this example, the "DELETE" statement could cause a large amount of data in the database to be changed, which in turn could affect the performance of the "SELECT" against the database. As such, the query management component 124 can be configured to detect, while in the process of executing a query, whether there are significant underlying changes in the database as a result of another query (e.g., issued from another job) executing against the database.

At block 508, the query management component 124 determines whether the difference between the first amount of data and the second amount of data satisfies a predetermined condition. In one embodiment, determining whether the difference satisfies the predetermined condition includes determining that the amount of data to be changed (e.g., from what was originally estimated) in the one or more tables of the database exceeds a threshold amount of data. In one embodiment, determining whether the amount of data to be changed satisfies the predetermined condition includes determining that the rate of data change in the one or more tables of the database exceeds a threshold data rate change. In one embodiment, determining whether the amount of data to be changed satisfies the predetermined condition includes determining that the amount of data to be changed (e.g., from what was originally estimated) in the one or more tables of the database is below a threshold amount of data.

If the predetermined condition is not satisfied, the query management component 124 can continue processing the first query according to the first ordered sequence of operations (block 516), and then return the results of the first query (e.g., to the requesting entity) (block 518). On the other hand, if the predetermined condition is satisfied, the query management component 124 halts processing of the first query according to the first access plan (block 510). At block 512, the query management component 124 determines a second ordered sequence of operations associated with a second access plan for executing the first query against the database, based on the difference in the first and second amounts of data change.

For example, continuing with the above example, the "DELETE" statement could cause the join order in the "SELECT" to flip when the plan is re-optimized (e.g., by the query management component 124). In some cases, the "DELETE" statement could make no reference to size at all (e.g., "DELETE from TABLEB where shipdate<'1/1/2000'") and still cause the join order to flip. In this case, the query management component 124 may have to know that a "SELECT" was running that made a decision based on size='large' and determine, during the execution of the "SELECT," that another job was causing "large rows" to be deleted. After a predetermined threshold number of rows with a size of "large" have been deleted, the query management component can stop and restart the "SELECT" with TABLEB in the first join position.

At block 514, the query management component 124 re-starts processing of the first query according to the second access plan. As noted above, in one embodiment, the query management component 124 can determine the second access plan in the background while executing the query according to the first access plan, e.g., as opposed to first halting the first access plan. Once determined, the query management component 124 can begin using the second access plan to execute the first query. Once completed, the query management component 124 returns the results of the first query (block 518), and then the method 500 ends.

Advantageously, embodiments herein enable the DBMS to adapt query processing in real-time in order to leverage a changing system environment by allowing the DBMS to stop the current execution of the query and re-start the query with a new access plan that is more suited to the current system environment.

According to some embodiments, the query management component 124 may determine to wait a predetermined period of time (for a second query to be processed against the database) and re-start execution of a first query against the database after the period of time has elapsed (e.g., as opposed to re-planning and re-starting the first query with the new access plan).

Figure 6:
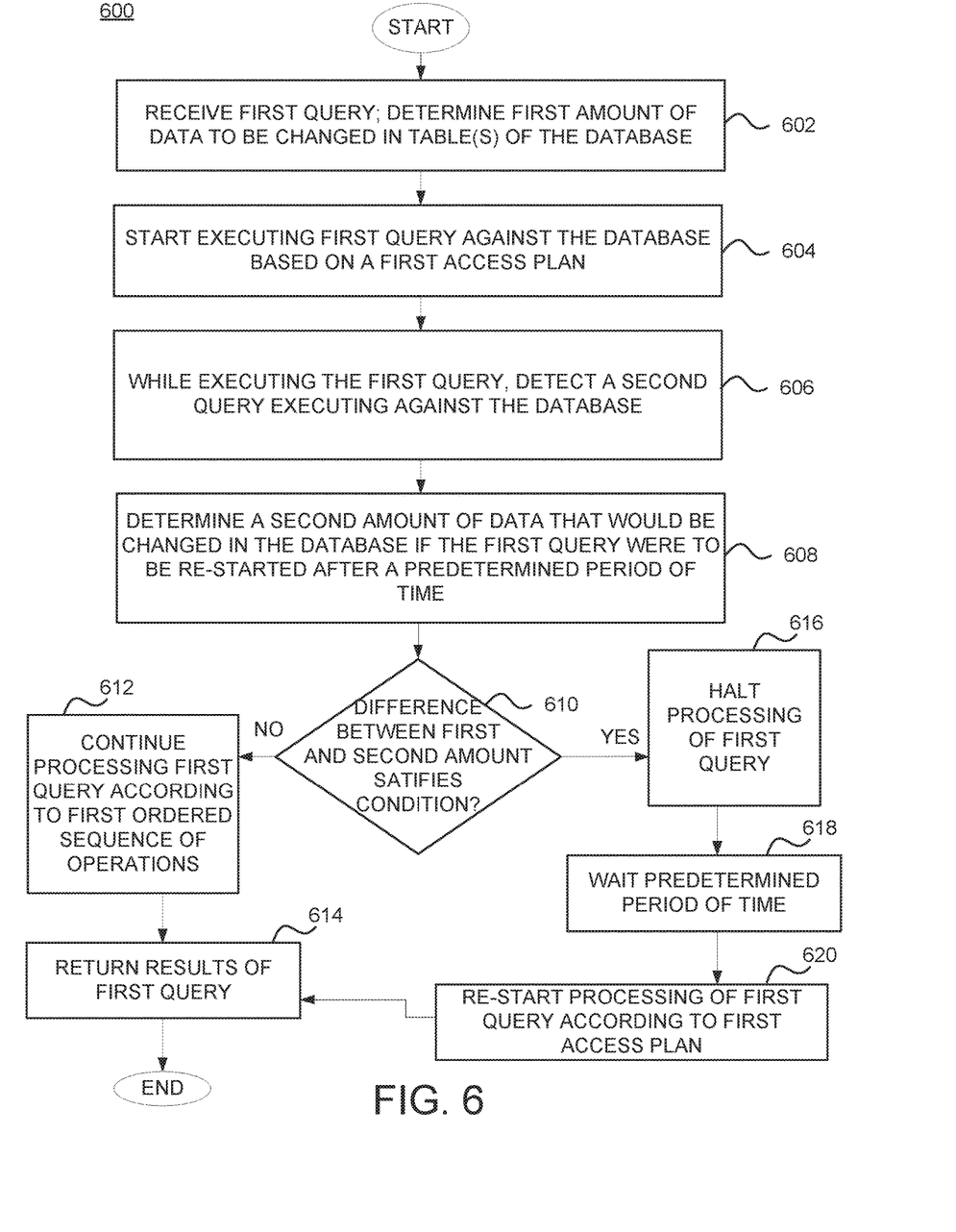
FIG. 6 is a flow chart illustrating another method for restarting a query based on an amount of data to be changed in processing the query, according to one embodiment of the present disclosure.

FIG. 6 is a flow chart illustrating another method 600 for restarting a query based on an amount of data to be changed in processing the query, according to one embodiment. As shown, the method 600 begins at block 602 where the query management component 124 receives a first query to be executed against a database. The query management component 124 determines a first amount of data to be changed in the database tables (e.g., as result of first query). At block 604, the query management component 124 starts executing the first query against the database according to a first access plan. At block 606, while executing the first query, the query management component 124 detects a second query executing against the database. The second query, for example, can be from another job inserting, updating, deleting, etc., one or more rows of the database.

At block 608, the query management component 124 determines a second amount of data that would be changed (or affected) in the database as a result of the first query if the first query were to be re-started after a predetermined period of time. At block 610, the query management component 124 determines whether the difference between the first and second amounts satisfies a predetermined condition. In one embodiment, determining that the difference satisfies the predetermined condition includes determining that the amount of data change exceeds a threshold amount of data. In one embodiment, determining that the difference satisfies the predetermined condition includes determining that the amount of data change is below a threshold amount of data. If the condition is satisfied, the query management component 124 can determine to let the second query process for a period of time and re-start the first query after the predetermined period of time. In some cases, the query management component 124 can choose to re-start the first query with the first access plan (e.g., instead of another access plan).

For example, assume that the query management component 124 receives (as a first query) a "DELETE" statement to be executed against the database. Further, assume that while executing the "DELETE," another job issues an UPDATE to update one or more rows of the database table(s). In this example, the query management component 124 may choose to halt processing of the "DELETE," let the "UPDATE" process for a predetermined period of time, and re-start execution of the DELETE after the predetermined period of time has elapsed. In this case, the query management component 124 may determine that another access plan for the DELETE is not necessary. However, in some embodiments, the query management component 124 can choose to re-start the first query with another access plan.

Continuing with the above example, the query management component 124 can choose to wait based on an estimate of the how much data in the database tables would be affected by the UPDATE. For example, if the query management component 124 determines that waiting (e.g., for the predetermined period of time) for the UPDATE to process would result in significantly more (or less) rows being deleted from the database, the query management component 124 may determine to wait for the predetermined period of time before re-starting the DELETE.

If the condition is satisfied, the query management component 124 halts processing of the first query according to the first access plan (block 616), waits a predetermined period of time (block 618), and re-starts processing of the first query according to the first access plan after the period of time has elapsed (block 620). The query management component 124 then returns the results of the first query (block 614). If the condition is not satisfied, the query management component 124 continues processing of the first query against the database (block 612), and returns the results of the first query (block 614).

In this manner, embodiments herein enable the DBMS to re-start and/or re-plan a query in order to leverage a changing system environment.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the DBMS) available in the cloud. For example, the DBMS could execute on a computing system in the cloud and receive user requests (e.g., queries) to access databases managed by the DBMS. In such a case, a query management component (e.g., configured on the DBMS) can halt processing of a query upon detecting that an amount of available system resources and/or amount of data change in the database tables satisfies one or more predetermined conditions, and re-start processing of the query with a new access plan more suited to the current environment. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
receiving a first query to be executed against a database;
starting execution of the first query against the database; and
upon detecting, during execution of the first query, that an amount of data to be changed in one or more tables of the database as a result of a second query satisfies a predetermined condition, determining whether to wait a predetermined period of time before re-starting execution of the first query against the database, wherein the determination is based on an estimated amount of data to be changed in the one or more tables of the database as a result of execution of the first query at an expiration of the predetermined period of time.

2. The method of claim 1, further comprising determining to wait the predetermined period of time if the estimated amount of data change exceeds a threshold amount of data or is below a threshold amount of data.

3. The method of claim 2, further comprising:
halting the execution of the first query against the database;
waiting the predetermined period of time for execution of the second query against the database; and
after the predetermined period of time has elapsed, re-starting execution of the first query against the database.

4. The method of claim 1, wherein detecting that the amount of data to be changed in the one or more tables of the database as a result of the second query satisfies the predetermined condition comprises determining that the amount of data to be changed in the one or more tables of the database as a result of the second query either exceeds a threshold amount of data or is below a threshold amount of data.

5. The method of claim 1, further comprising:
monitoring, during the execution of the first query, a rate of change of data in the one or more tables of the database in response to an ordered sequence of operations associated with the second query.

6. The method of claim 5, wherein detecting that the amount of data to be changed in the one or more tables of the database as a result of the second query satisfies the predetermined condition comprises determining that the rate of data change in the one or more tables of the database as a result of the second query exceeds a threshold data rate change.

7. The method of claim 5, wherein one or more operations of the ordered sequence of operations comprises at least one of an insertion of one or more rows in the one or more tables of the database, an update to one or more rows in the one or more tables of the database, or a deletion of one or more rows in the one or more tables of the database.

8. A system, comprising:
a computer processor; and
a memory containing a program that, when executed on the computer processor, performs an operation, comprising:
receiving a first query to be executed against a database;
starting execution of the first query against the database; and
upon detecting, during execution of the first query, that an amount of data to be changed in one or more tables of the database as a result of a second query satisfies a predetermined condition, determining whether to wait a predetermined period of time before re-starting execution of the first query against the database, wherein the determination is based on an estimated amount of data to be changed in the one or more tables of the database as a result of execution of the first query at an expiration of the predetermined period of time.

9. The system of claim 8, the operation further comprising:
determining to wait the predetermined period of time if the estimated amount of data change exceeds a threshold amount of data or is below a threshold amount of data;
halting the execution of the first query against the database;
waiting the predetermined period of time for execution of the second query against the database; and
after the predetermined period of time has elapsed, re-starting execution of the first query against the database.

10. The system of claim 8, wherein detecting that the amount of data to be changed in the one or more tables of the database as a result of the second query satisfies the predetermined condition comprises determining that the amount of data to be changed in the one or more tables of the database as a result of the second query either exceeds a threshold amount of data or is below a threshold amount of data.

11. The system of claim 8, the operation further comprising:
monitoring, during the execution of the first query, a rate of change of data in the one or more tables of the database in response to an ordered sequence of operations associated with the second query, wherein detecting that the amount of data to be changed in the one or more tables of the database as a result of the second query satisfies the predetermined condition comprises determining that the rate of data change in the one or more tables of the database as a result of the second query exceeds a threshold data rate change.

12. A computer program product, comprising a non-transitory computer-readable storage medium having computer readable program code embodied therewith, the computer readable program code executable by one or more computer processors to perform an operation, comprising:
receiving a first query to be executed against a database;
starting execution of the first query against the database; and
upon detecting, during execution of the first query, that an amount of data to be changed in one or more tables of the database as a result of a second query satisfies a predetermined condition, determining whether to wait a predetermined period of time before re-starting execution of the first query against the database, wherein the determination is based on an estimated amount of data to be changed in the one or more tables of the database as a result of execution of the first query at an expiration of the predetermined period of time.

13. The computer program product of claim 12, the the operation further comprising:
determining to wait the predetermined period of time if the estimated amount of data change exceeds a threshold amount of data or is below a threshold amount of data.

14. The computer program product of claim 13, the the operation further comprising:
halting the execution of the first query against the database;
waiting the predetermined period of time for execution of the second query against the database; and
after the predetermined period of time has elapsed, re-starting execution of the first query against the database.

15. The computer program product of claim 12, wherein detecting that the amount of data to be changed in the one or more tables of the database as a result of the second query satisfies the predetermined condition comprises determining that the amount of data to be changed in the one or more tables of the database as a result of the second query either exceeds a threshold amount of data or is below a threshold amount of data.

16. The computer program product of claim 12, the operation further comprising monitoring, during the execution of the first query, a rate of change of data in the one or more tables of the database in response to an ordered sequence of operations associated with the second query.

17. The computer program product of claim 16, wherein detecting that the amount of data to be changed in the one or more tables of the database as a result of the second query satisfies the predetermined condition comprises determining that the rate of data change in the one or more tables of the database as a result of the second query exceeds a threshold data rate change.

18. The computer program product of claim 16, wherein one or more operations of the ordered sequence of operations comprises at least one of an insertion of one or more rows in the one or more tables of the database, an update to one or more rows in the one or more tables of the database, or a deletion of one or more rows in the one or more tables of the database.

19. The system of claim 11, wherein one or more operations of the ordered sequence of operations comprises at least one of an insertion of one or more rows in the one or more tables of the database, an update to one or more rows in the one or more tables of the database, or a deletion of one or more rows in the one or more tables of the database.

* * * * *